United States Patent
Penttonen

(10) Patent No.: US 11,862,961 B2
(45) Date of Patent: Jan. 2, 2024

(54) APPARATUS AND METHOD FOR OPERATING ELECTRIC POWER NETWORK

(71) Applicant: ENSTO OY, Porvoo (FI)

(72) Inventor: Jyrki Penttonen, Helsinki (FI)

(73) Assignee: ENSTO OY, Porvoo (FI)

( * ) Notice: Subject to any disclaimer, the term of this patent is extended or adjusted under 35 U.S.C. 154(b) by 243 days.

(21) Appl. No.: 17/426,343

(22) PCT Filed: Jan. 31, 2020

(86) PCT No.: PCT/FI2020/050059
§ 371 (c)(1),
(2) Date: Jul. 28, 2021

(87) PCT Pub. No.: WO2020/161386
PCT Pub. Date: Aug. 13, 2020

(65) Prior Publication Data
US 2022/0094152 A1    Mar. 24, 2022

(30) Foreign Application Priority Data

Feb. 4, 2019 (FI) ...................................... 20195070

(51) Int. Cl.
*H02M 3/16*      (2006.01)
*H02H 3/16*      (2006.01)
*H02H 1/00*      (2006.01)

(52) U.S. Cl.
CPC ............ *H02H 3/16* (2013.01); *H02H 1/0007* (2013.01)

(58) Field of Classification Search
CPC ........ H02H 3/16; H02H 1/0007; H02H 3/027; H02H 9/005
See application file for complete search history.

(56) References Cited

U.S. PATENT DOCUMENTS 2,162,516 A * 6/1939 Parsons .................. H01H 75/04
361/76
2,258,234 A   10/1941 Bancker
(Continued)

FOREIGN PATENT DOCUMENTS

CN       2884641 Y      3/2007
CN     101055986 A     10/2007
(Continued)

OTHER PUBLICATIONS

Penttonen, J. et al., *Smart grid element: efficient controllable inductance with virtual air gap*, In: IET Gener. Transm. Distrib. UK:IET, Jan. 2, 2018, vol. 12, No. 1, pp. 72-77, ISSN 1751-8687, <DOI: 10.1049/iet-gtd.2016.2122> abstract.
(Continued)

*Primary Examiner* — Adolf D Berhane
*Assistant Examiner* — Afework S Demisse
(74) *Attorney, Agent, or Firm* — ALSTON & BIRD LLP

(57) ABSTRACT

An apparatus and a method for operating an electric power network are disclosed. The electric power network is a compensated network arranged to be compensated by an arc suppression coil. An indication for an occurrence of an earth fault in the electric power network is received and the arc suppression coil is tuned away from resonance with respect to a resonance point of the electric power network, while the earth fault is present in the electric power network, to increase fault current in the electric power network for tripping one or more relays in the electric power network.

15 Claims, 7 Drawing Sheets

(56) References Cited

U.S. PATENT DOCUMENTS 2,258,248 A     10/1941   Hunter
2,360,182 A * 10/1944   Warrington .............. H02H 1/04
                                                                      361/80

FOREIGN PATENT DOCUMENTS

| | | |
|---|---|---|
| CN | 103293446 A | 9/2013 |
| CN | 207516481 U | 6/2018 |
| CN | 108845223 A | 11/2018 |
| CN | 209280851 U | 8/2019 |
| DE | 10 2016 110 420 A1 | 12/2017 |
| RO | 114520 B1 | 4/1999 |

OTHER PUBLICATIONS

Finnish Search Report for Application No. 20195070 dated Sep. 3, 2019 (2 pages).
International Search Report for PCT/FI2020/050059 (ISA/EP) dated Apr. 20, 2020 (3 pages).
Written Opinion for PCT/FI2020/050059 (ISA/EP) dated Apr. 20, 2020 (6 pages).
Office Action for Finnish Patent Application No. 20195070, dated Dec. 21, 2022 (7 pages).

* cited by examiner

APPARATUS AND METHOD FOR OPERATING ELECTRIC POWER NETWORK

CROSS-REFERENCE TO RELATED APPLICATIONS

The present application is a national phase entry of International Application No. PCT/FI2020/050059, filed Jan. 31, 2020, which claims priority to Finnish Patent Application No. 20195070, filed Feb. 4, 2019, which are incorporated herein by reference in their entirety.

FIELD

The present disclosure relates to operating an electric power network. In particular, the disclosure relates to operating an electric power network during an earth fault.

BACKGROUND

Earth faults cause interruptions in the delivery of electricity over electric power networks. They may be caused, for example, by a tree fallen on a power line creating a direct physical connection from the line to earth.

There are various alternatives for grounding an electric power network. In resonant-earthed networks, and compensated networks in particular, arc suppression coils are used to compensate for capacitive earth fault currents. The coil produces inductive reactance which at least partially compensates for the capacitive reactance in the network so that when an earth fault occurs, the resulting fault current is smaller than it would be without the arc suppression coil.

OBJECTIVE

An objective is to improve performance of the current systems utilizing arc suppression coils.

In particular, it is an objective to provide a way to improve control over protective relays in a compensated electric power network.

SUMMARY

The present disclosure involves operating an arc suppression coil (ASC), also known as a Petersen coil. The arc suppression coil is adapted to be operated in an electric power network, which may be a three-phase network. The electric power network comprises power lines, which may be subject to earth faults. During an earth fault, such as a phase-to-earth fault, a power line comes into electric contact with earth, i.e. to the ground of the electric power network. This may take place through a fault arc, formed at the location of the earth fault.

According to a first aspect, an apparatus, such as a controller, for operating an electric power network is disclosed. The electric power network is a compensated network arranged to be compensated by an arc suppression coil. The apparatus is adapted to receive an indication for an occurrence of an earth fault in the electric power network. The indication means that the normal operation of the electric power network, i.e. operation in the absence of an earth fault, has been interrupted, which typically means that the delivery of electricity in at least a part of the electric power network has to be stopped unless the earth fault is removed.

The apparatus is adapted to tune the arc suppression coil away from resonance with respect to a resonance point of the electric power network, while the earth fault is present in the electric power network, to increase fault current in the electric power network for tripping one or more relays in the electric power network. This allows using the apparatus to ensure that the one or more relays, which may be configured to function independently, trip when desired. The one or more relays are protective relays, such as feeder relays, and they can be adapted to disconnect a power line when the power line is subject to an earth fault. Consequently, this allows also protecting the electric power network and its surroundings from damage due to a fault arc corresponding to the earth fault as the apparatus can be adapted to trip the one or more relays to extinguish the fault arc by disconnecting the one or more power lines protected by the one or more relays. Typically, the one or more relays may be configured to function independently so that they trip when the current and/or voltage in the one or more power lines protected by the one or more relays satisfies certain conditions, which may comprise exceeding a threshold value, optionally conditional on the threshold value being exceeded for a threshold time as well. While such relays typically trip automatically upon the occurrence of an earth fault, it is possible with the apparatus in accordance with the present disclosure to first attempt to extinguish the fault arc corresponding to the earth fault and, if the attempt is unsuccessful, trip a protective relay to extinguish the fault arc. In particular, this may be flexibly performed by adjusting the reluctance of the arc suppression coil, e.g. by adjusting the size of a virtual air gap of the arc suppression coil. Specific requirements posed for operation of the relays may be also set by local regulations, and the flexibility provided by the disclosed control procedure allows the requirements to be followed even when the current visible to the relays is initially suppressed in an attempt to extinguish the fault arc.

While the arc suppression coil is tuned away from the resonance point to trip the one or more relays, the initial state, i.e. the state from which the tuning is initiated, can be on-resonance or off-resonance with respect to the resonance point. Moreover, the arc suppression coil may be tuned first towards resonance or to resonance, or it may be tuned directly away from resonance.

The resonance point is typically the fault state resonance point of the electric power network, which may be determined while the earth fault is present in the electric power network. However, the fault state resonance point needs not necessarily be determined for tuning the arc suppression coil away from resonance with respect to the resonance point. This is because continuing to either increase or decrease the inductance of the arc suppression coil in one direction will, at least at some point, tune the arc suppression coil away from resonance. The increase or decrease may be continued further until the one or more relays are be tripped. Alternatively, the normal state resonance point, determined when the electric power network is in normal operation, is typically already known, even if the fault state resonance point is not. Consequently, the arc suppression coil may be tuned away from the normal state resonance point until the one or more relays are tripped. In typical real-world electric power networks, the fault state resonance point remains close or substantially at the normal state resonance point so that using the normal state resonance point, which may be determined beforehand, for tuning the arc suppression coil away from the resonance point may provide an efficient way for quickly tripping the one or more relays. In such situations, the normal state resonance point can be used as approximation for the fault state resonance point.

Tuning of the arc suppression coil may be controlled by adjusting the impedance, e.g. the inductance, of the arc suppression coil. This impedance is the impedance of the arc suppression coil visible to the electric power network and it may substantially correspond to the total inductive reactance of the electric power network. Tuning can be performed by adjusting the inductance of a single reactive element producing the inductance of the arc suppression coil visible to the electric power network. This allows adjusting the total inductance of the electric power network without coupling or decoupling any separate inductances to the electric power network. Instead of such a discrete adjustment, the arc suppression coil can be adapted for substantially continuous adjustment of inductance. In the resonance point of the electric power network, which may be a normal state resonance point during normal operation or a fault state resonance point when the earth fault is present in the electric power network, the inductance of the arc suppression coil corresponds to a first value with which the inductive reactance of the electric power network optimally compensates the capacitive reactance of the electric power network. For perfect compensation, the magnitude of the capacitive reactance of the electric power network is equal to the magnitude of the inductive reactance of the electric power network for the operating frequency of the electric power network. In off-resonance, the inductance of the arc suppression coil is larger or smaller than the first value. The former case corresponds to an overcompensated state and the latter case corresponds to an undercompensated state. Tuning of the arc suppression coil away from resonance corresponds to adjusting the inductance of the arc suppression coil away from the first value. Increasing the inductance leads to an overcompensated state, whereas decreasing the inductance leads to an undercompensated state. In the absence of an earth fault, the arc suppression coil may be operated in an overcompensated state or in an undercompensated state.

The tuning can be automatically performed after receiving the indication for the occurrence of the earth fault allowing a quick response to an earth fault, even in milliseconds, if necessary. When the apparatus has received an indication that the earth fault has been removed, the apparatus may be adapted to return to normal operation, for example to operating the arc suppression coil on-resonance or off-resonance with respect to the normal state resonance point of the electric power network. The solution allows flexibly adjusting the operation of the arc suppression coil when the earth fault is present, in contrast to earlier implementations where the inductance of the arc suppression coil remains constant in the presence of an earth fault and relays are tripped with alternate means. Here, the one or more relays may be tripped by autonomous operation of the apparatus.

In an embodiment, the apparatus is adapted to tune the arc suppression coil by adjusting the reluctance of the arc suppression coil. This allows conveniently operating the arc suppression coil towards and/or away from resonance even when the earth fault is present in the electric power network. In a further embodiment, the apparatus is adapted to adjust the reluctance of the arc suppression coil by adjusting the size of a virtual air gap of the arc suppression coil. This allows the reluctance to be adjusted quickly, e.g. even in less than 1-10 milliseconds. It is noted that the arc suppression coil may, additionally or alternatively, be operated into and/or out of resonance using, for example, an inverter, which may be adapted to feed reactive current into the arc suppression coil. In comparison to this, the reluctance adjustment as disclosed here, e.g. by adjusting a virtual air gap, has an additional effect in that it may be performed without generating additional harmonics which impede extinguishing the fault arc.

It is noted that other means for varying the impedance of the arc suppression coil can also be used for tuning the arc suppression coil, including stepwise variation of impedance and other means. For example, impedance of the arc suppression coil may be varied by the arc suppression coil having one or more variable impedance windings, which can be adapted for varying the zero sequence impedance of the electric power network. Such a variable impedance winding may be formed, for example, by a switched capacitor bank. The one or more variable inductance windings may comprise, for example, one or more capacitors adapted for adjusting the impedance of the arc suppression coil, or zero sequence impedance of the electric power network in particular.

In an embodiment, the apparatus is adapted to determine a threshold time for tripping the one or more relays and tune the arc suppression coil away from resonance after the threshold time from receiving the indication for the occurrence of the earth fault in the electric power network. This allows the exposure of the electric power network and its surroundings to the earth fault to be limited. The threshold time may be dependent on the magnitude of the fault current.

In an embodiment, the one or more relays are configured with relay characteristics of an isolated network. This allows generally available relays for operating electric power network in the presence of an earth fault to be used, so that no special relays need to be installed. When the arc suppression coil is tuned off-resonance and operated in an overcompensated state, the magnitude of the inductive reactance of the electric power network becomes larger than the magnitude of the capacitive reactance of the electric power network caused by line-to-earth capacitances. Thus, the fault current becomes capacitive in a similar way that it is capacitive in isolated networks, where there is no arc suppression coil. When the arc suppression coil is operated in an overcompensated state, the situation corresponding to an occurrence of an earth fault from the point of view of the one or more relays can be made similar to a situation corresponding to an occurrence of the earth fault in an isolated network. This allows the relays to be set-up in a way in accordance with the normal practise for isolated network protection.

In an embodiment, the apparatus is adapted to determine the resonance point of the electric power network, or an indication thereof, by maximizing the zero sequence voltage of the electric power network, for example by an iterative method. This provides a reliable measure for the resonance point, which can be made readily available in many electric power networks and which may be flexibly used also during the presence of an earth fault. The apparatus may be specifically adapted to determine the zero sequence voltage or a value indicative thereof for determining the resonance point of the electric power network or an indication thereof. In another embodiment, which may be used additionally or alternatively with the solution of the previous embodiment, the apparatus is adapted to determine the normal state resonance point and/or a fault state resonance point of the electric power network, or one or more indications thereof, by minimizing the negative sequence current of the electric power network, for example by an iterative method. This allows minimizing the fault current quickly and it may also allow improving the accuracy for determining the resonance point. The apparatus may be specifically adapted to determine the negative sequence current or a value indicative thereof for determining the resonance point of the electric power network, or an indication thereof. Both of the above embodiments allow operating the arc suppression coil without separate configuration such as determining the total capacitance of the electric power network.

In an embodiment, the indication for an occurrence of an earth fault is determined based on an increase in a zero sequence voltage of the electric power network or an indication thereof. This provides a reliable measure for the resonance point, which can be made readily available in many electric power networks. In another embodiment, which may be used additionally or alternatively with the solution of the previous embodiment, the indication for an occurrence of an earth fault is determined based on an increase in a negative sequence current of the electric power network or an indication thereof. Especially in certain situations, this may allow notably improving the accuracy for determining the occurrence of the earth fault. Again, both of the above embodiments allow operating the arc suppression coil without separate configuration such as determining the total capacitance of the electric power network. Similarly, an indication for the disappearance of the earth fault can be determined based on a decrease in the zero sequence voltage and/or the negative sequence current. The apparatus may be adapted to determine the indication for the occurrence of the earth fault and/or the indication for the disappearance of the earth fault, for example by one or more measurements.

According to a second aspect, a method for operating an electric power network is disclosed. The electric power network is a compensated network arranged to be compensated by an arc suppression coil. The method comprises receiving an indication for an occurrence of an earth fault in the electric power network and tuning the arc suppression coil away from resonance with respect to a resonance point of the electric power network, while the earth fault is present in the electric power network, to increase fault current in the electric power network for tripping one or more relays in the electric power network. The one or more relays are protective relays, which can be adapted to disconnect a power line when the power line is subject to an earth fault. The method may involve utilizing the apparatus in accordance with the first aspect or any of its embodiments. Also, any or all procedures disclosed may be applied as part of the method even if the apparatus as such is not used.

In an embodiment, the arc suppression coil is tuned by adjusting the reluctance of the arc suppression coil. In a further embodiment, the reluctance of the arc suppression coil is adjusted by adjusting the size of a virtual air gap of the arc suppression coil.

In an embodiment, the method comprises determining a threshold time, for tripping the one or more relays, and tuning the arc suppression coil away from resonance after the threshold time from receiving the indication for the occurrence of the earth fault in the electric power network.

In an embodiment, the one or more protective relays are configured with relay characteristics of an isolated network.

In an embodiment, the method comprises determining the resonance point of the electric power network, or an indication thereof, by maximizing the zero sequence voltage and/or by minimizing the negative sequence current, or an indication thereof. The zero sequence voltage and/or the negative sequence current, or one or more indications thereof, may be separately determined for determining the resonance point or the indication thereof.

In an embodiment, the indication for an occurrence of an earth fault is determined based on an increase in the zero sequence voltage of the electric power network or an indication thereof and/or on an increase in the negative sequence current of the electric power network or an indication thereof. The zero sequence voltage and/or the negative sequence current, or one or more indications thereof, may be separately determined for determining the indication for the occurrence of the earth fault. Similarly, an indication for the disappearance of the earth fault can be determined.

According to a third aspect, a computer program product comprises instructions which, when executed by a computer, cause the computer to carry out the method in accordance with the second aspect or any of its embodiments.

The determination of the resonance point may be performed by the apparatus. The determination may be based on one or more measurements, which may be local, of current and/or voltage. The one or more measurements may comprise one or more measurements of phase current and/or phase voltage from a phased power line. The resonance point may be determined by maximizing the zero sequence voltage and/or by minimizing by minimizing the fault current of the electric power network, for example by minimizing the negative sequence current of the electric power network, for example by an iterative method. Alternatively or additionally, the resonance point may be determined by another method such as a current injection method.

As an example, for determination of the normal state resonance point and/or the fault state resonance point, one or more current measurements from the one or more relays may be used by using automation protocols such as DNP, IEC or Goose. A faulty feeder can be identified by comparing zero sequence voltage with one or more phase voltages. Once the faulty feeder has been identified, the arc suppression coil can be tuned so that negative sequence current, which may be measured directly from the one or more relays, gets minimized. Negative sequence current in a faulty feeder can be used as a good estimate of fault current at the fault location.

The zero sequence voltage may be determined as an average of phase voltages in the electric power network. This can be done also when there is no star point in the electric power network for measuring a physical zero voltage. In the absence of a neutral point in the electric power network, a phase voltage can be considered as the voltage between a phased power line and the earth of the electric power network. In a three-phase network, the zero sequence voltage may thus be determined as a sum of the three phase voltages of the electric power network, corresponding to different phases in the electric power network, divided by three. The determination may be performed by the apparatus. The determination may be based on one or more measurements, which may be local, of current and/or voltage. The one or more measurements may comprise one or more measurements of phase current and/or phase voltage from a phased power line.

An indication of change in the state of the electric power network may be used to allow an efficient control procedure for the electric power network. Such an indication of change in the state may be an indication of change in the zero sequence voltage of the electric power network and/or an indication of change in the fault current of the electric power network, for example an indication of change in the negative sequence current. The indication of change in the state of the electric power network alone can be used to control the operation of the arc suppression coil to detect an occurrence and/or a disappearance of an earth fault and, alternatively or additionally, to determine the resonance point of the electric power network. Consequently, the operation of the arc suppression coil can be controlled solely based on measurements indicative of change in state of the electric power network, and no configuration measurements such as measurements for the total capacitance of the electric power network are required. The measurements indicative of change in the state of the electric power network may comprise measurements indicative of the zero sequence voltage and/or of the fault current, e.g. of the negative sequence current. The indication of change may be determined when necessary, for example by the apparatus. It may be determined, for example, for determining the resonance point of the electric power network. Any indications of change in the state of the electric power network may also be monitored, for example by the apparatus, e.g. by sustained or continuous monitoring.

In some electric power networks, such as symmetric networks, the zero sequence voltage of the electric power network may be low. There, an impedance element may be connected between one phase and the earth to increase the zero sequence voltage.

Alternatively or additionally to using the zero sequence voltage or a value indicative thereof, the arc suppression coil may be operated based on one or more measurements indicative of the fault current during the earth fault. One way to estimate the amount of the fault current at the location of the earth fault is to measure current in a substation transformer of the electric power network or in one or more power lines of the electric power network, e.g. in one or more power lines going out of a substation of the electric power network. In particular, the negative sequence current of the electric power network may be used as an estimate for the fault current. During an earth fault, the arc suppression coil can thereby be tuned based on the negative sequence current, for example by minimizing the negative sequence current to minimize the fault current. Using current measurements such as a measurement of the negative sequence current of the electric power network may allow notably improving the accuracy for operating the arc suppression coil. For example, for a low-impedance earth fault the negative sequence current may be used for providing a sharper resonance than many other methods allowing improved determination of the resonance point of the electric power network.

The apparatus and method as disclosed herein may be adapted for autonomous operation. The arc suppression coil may be controlled independently based only on measurements indicative of the zero sequence voltage and/or the fault current, e.g. of the negative sequence current, which allows minimizing set-up and configuration tasks, enabling fast deployment.

By tripping the one or more relays by tuning the arc suppression coil, additional costly equipment such as an oil-immersed resistor with a switching element are not needed. Moreover, tuning the arc suppression coil allows ensuring that the one or more relays see enough current for tripping, thereby removing any need to include additional resistive components in the electric power network which, especially maintained constantly present, may significantly reduce any chances of extinguishing the fault arc during an earth fault.

It is to be understood that the aspects and embodiments described above may be used in any combination with each other. Several of the aspects and embodiments may be combined together to form a further embodiment.

BRIEF DESCRIPTION OF THE DRAWINGS

The accompanying drawings, which are included to provide a further understanding and constitute a part of this specification, illustrate embodiments and together with the description help to explain the principles of the invention. In the drawings.

Like references are used to designate equivalent or at least functionally equivalent parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Figure 1:
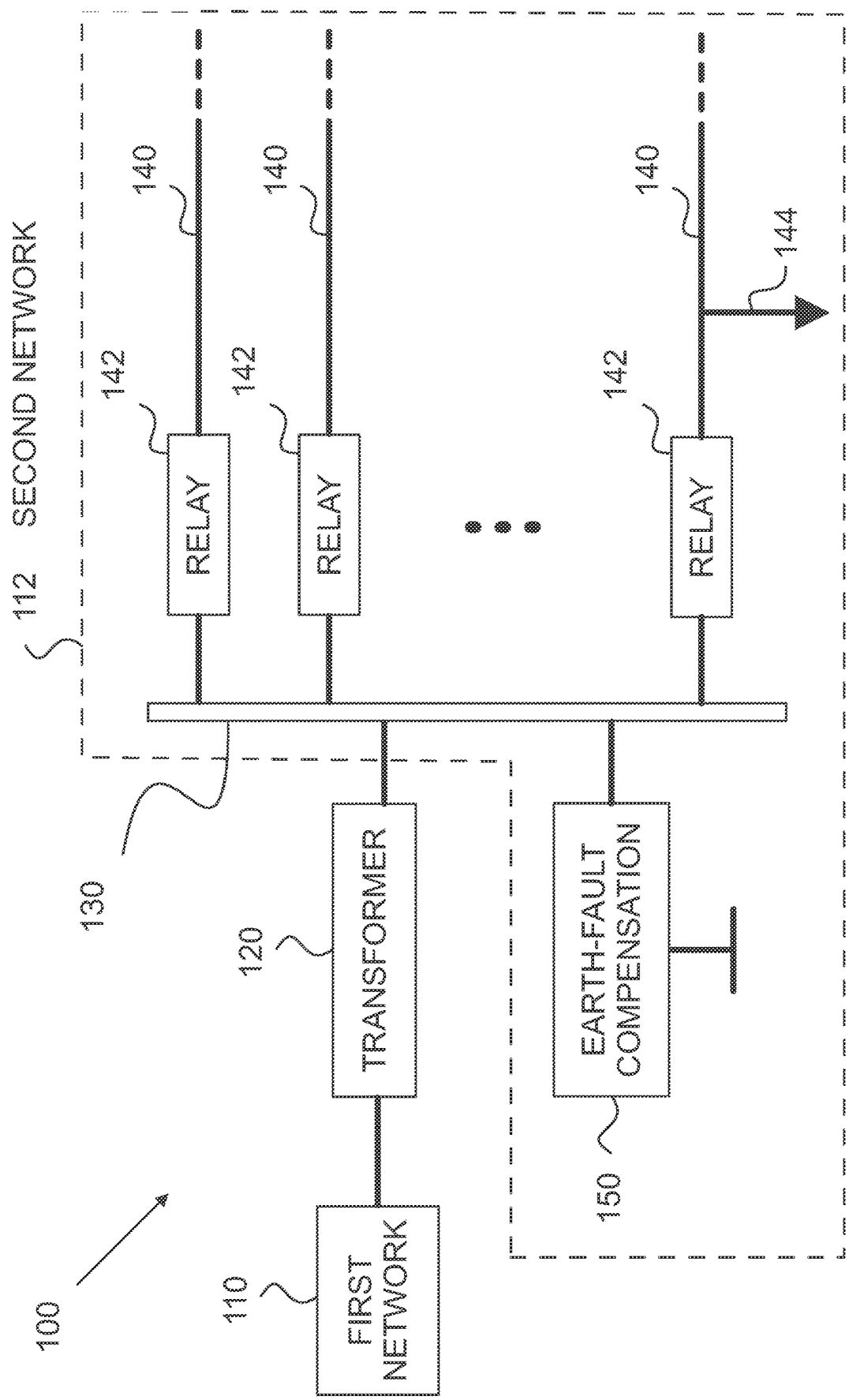
FIG. 1 illustrates an electric power network system according to an example.

FIG. 1 shows an example of an electric power network system 100 (below also "the network system"). The network system 100 may be part of an electrical grid, e.g. a national or a regional grid, for delivering electricity from producers to consumers. The network system 100 may comprise a transmission network and/or a distribution network. The network system 100 may comprise a first network 110, such as a high-voltage network or a transmission network. In addition, the network system 100 may comprise a second network 112, such as a medium-voltage network, a distribution network or a low-voltage network. The network system 100 may further comprise a transformer 120, such as a substation primary transformer, for lowering the voltage from the first network 110 and/or to the second network 112. The second network 112 may be connected to the first network region 110 through the transformer 120.

In the following, earth-fault compensation is illustrated in the second network 112 (below also "the network"). However, it should be understood that the present invention may be used wherever an arc suppression coil, or a Petersen coil, is used.

The network 112 may be an alternating current network, such as a three-phase network. The network 112 may have an operating frequency, e.g. 50-60 Hz, which may be constant. The network 112 comprises an arrangement 150 (below also "the arrangement") which may be adapted for earth fault compensation in the network 112, so that the network 112 is a compensated network. The arrangement 150 may be adapted to be located at an electrical substation, such as at the substation between a transmission network and a distribution network. However, the arrangement 150 may also be adapted to be located together with a distribution transformer, in which case the arrangement 150 may be adapted for distributed earth fault compensation. Consequently, the arrangement 150 may be used, for example, not only where high-voltage is converted to medium-voltage but, alternatively or additionally, where medium-voltage is converted to low-voltage. The arrangement 150 comprises one or more arc suppression coils, adapted to compensate capacitive reactance of the network 112 during an earth fault. The inductive reactance of the one or more arc suppression coils may substantially correspond to the inductive reactance of the network 112 so that the inductive reactance of the network 112 is substantially due to the one or more arc suppression coils. The arrangement 150 may be directly connected to earth, i.e. to the ground of the network 112. The arrangement 150 may, at least partially, comprise an apparatus, such as a controller, for operating the network 112. However, it is noted that the apparatus may also be comprised in a distributed system for controlling the electric power network 112.

The electric power network 112 may comprise one or more feeders 140, e.g. distribution network feeders, for feeding electricity forward in the network 112. A feeder 140 may be an overhead feeder or an underground feeder. A feeder 140 may comprise one or more power lines. For example, in a three-phase network a feeder 140 may comprise three power lines, one for each phase. A feeder 140 may be protected by one or more relays 142, i.e. protective relays, which may adapted to disconnect the one or more power lines of the feeder 140 during a fault, such as an earth fault. Consequently, the fault current corresponding to an earth fault may be removed by tripping one or more of the one or more relays 142. The one or more relays 142 may be adapted for independent operation, for example in that they measure current and/or voltage in one or more power lines of the feeder 140 and disconnect the one or more power lines under specified conditions. These measurements may be local, i.e. at the feeder 140. A relay 142 can be adapted to disconnect one or more power lines, e.g. by opening its own breaker, if it finds a fault condition. The one or more relays 142 may comprise a microprocessor. While the relays 142 may be adapted for various types of fault situations, it is noted that in typical networks the functioning and reliability of the relays 142 may be affected by their operating conditions. The apparatus for operating the network 112 may be adapted to control the one or more arc suppression coils. The apparatus may also be adapted to indirectly control the tripping of the one or more relays 142 by altering the zero sequence voltage of the network 112.

The electric power network 112 may comprise a bus 130 such as a substation bus. The bus 130 may be a medium-voltage bus. The bus 130 may be arranged to connect the arrangement 150 to the one or more feeders 140. Alternatively or additionally, the bus 130 may be arranged to connect the arrangement 150 to the transformer 120. The arrangement 150 may be used to provide earth fault compensation to a plurality of feeders 140.

An earth fault may take place when a power line of a feeder 140 comes into electric contact with the earth. In principle, a fault location 144 may be at any point along the length of the feeder 140, which may have a length of several kilometers.

Figure 2:
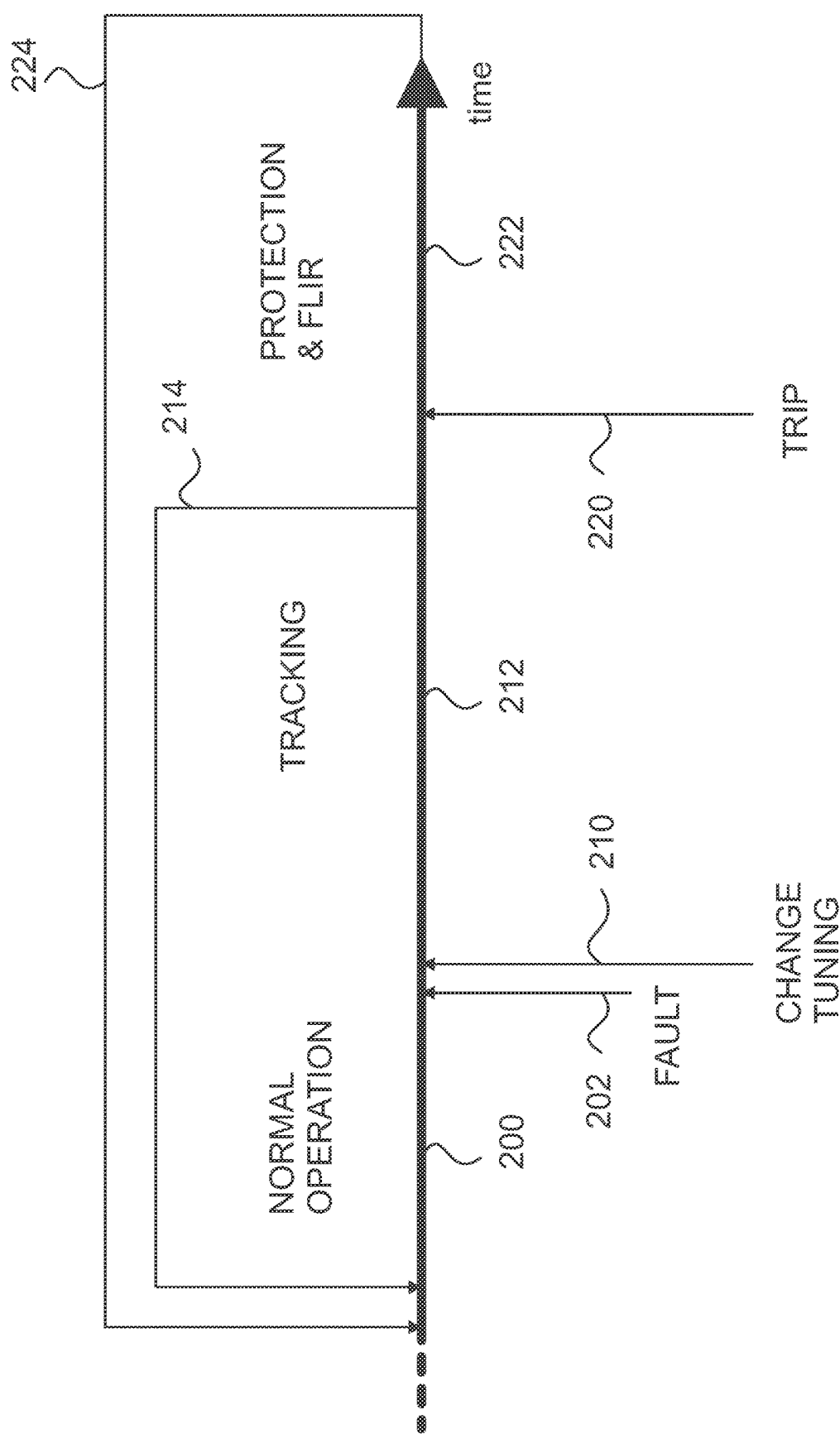
FIG. 2 illustrates operating an electric power network compensated by an arc suppression coil according to an example.

FIG. 2 shows an example of operating an electric power network 112, which can be the network 112 described above, e.g. by the apparatus described above. Operating the network 112 comprises operating an arc suppression coil in the network 112. In normal operation 200, the arc suppression coil may be operated on-resonance or off-resonance with respect to a normal state resonance point of the network 112. The first alternative means that the inductance of the arc suppression coil is adjusted so that the magnitude of the inductive reactance of the network 112 is substantially equal to the magnitude of the capacitive reactance of the network 112, whereas the latter alternative means that the magnitudes of the inductive and the capacitive reactance are substantially different from each other. The arc suppression coil may be operated off-resonance by 5-20 percent, when calculated from the total capacitance of the network 112, e.g. from the line-to-earth capacitance. However, the present disclosure allows even larger values, for example up to 50-70 percent. Increasing the departure from resonance allows reducing the zero sequence voltage of the network 112, which may in turn reduce power losses in the network 112. Operating the arc suppression coil on-resonance or close to the normal state resonance point allows reducing any initial fault current in the occurrence of an earth fault.

Normal operation 200 of the network 112 is interrupted by the occurrence of an earth fault 202 in the network 112. As a result, a fault current will flow at the fault location 144 between the faulty feeder 140 and the earth. Since the arc suppression coil is operated off-resonance, the fault current, which may be over 10 A, e.g. 15-20 A, has both a resistive component and a reactive component, the latter of which may be for example 7-15 A. In response to the earth fault, an indication is received, e.g. by the apparatus, for the occurrence of the earth fault. The occurrence may be determined, for example, based on an increase in a zero sequence voltage of the network 112 or an indication thereof and/or an increase in the negative sequence current of the network 112 or an indication thereof. This determination may be based on one or more measurements of current and/or voltage. The measurements may be local, e.g. at a bus 130 such as a substation bus directly connected to the arrangement 150 for earth fault compensation.

After the indication for the occurrence of the earth fault has been received, the tuning of the arc suppression coil may be changed 210, e.g. by the apparatus. Importantly, the tuning may be changed while the earth fault is present in the network 112. Tuning the arc suppression coil towards resonance reduces the reactive component of the fault current, thereby reducing the total fault current. This may markedly improve the probability of extinguishing the fault arc, thereby removing the earth fault. Moreover, it allows reducing the risk of damage from dangerously high contact voltage. The arc suppression coil may be tuned directly or sequentially to resonance with respect to the normal state resonance point in an attempt to remove the earth fault. Alternatively or additionally, it is possible to determine a fault state resonance point of the network 112 or a value indicative thereof, while the earth fault is present in the network 112, and tune the arc suppression coil to resonance with respect to this fault state resonance point. This may allow even further reduction in the fault current, when the fault state resonance point has shifted substantially from the normal state resonance point. In typical real-world networks, the fault state resonance point remains close or substantially at the normal state resonance point. This means that any initial change in tuning towards the normal state resonance point corresponds also to a change in tuning towards the fault state resonance point. An initial change in tuning towards the fault state resonance point, which equals a change in tuning towards the normal state resonance point, can therefore be made already before the fault state resonance point or a value indicative thereof has been determined. This allows quick reaction to the occurrence of the earth fault as the tuning may be changed in milliseconds or even less. Naturally, the determination for the fault state resonance point may also be performed before any change in tuning.

The change in tuning can be considered as entering into a tracking mode 212 for attempting to extinguish the fault arc. If the attempt to extinguish the fault arc is successful, the arc suppression coil may be returned 214 to off-resonance for normal operation 200 of the network 112. The disappearance of the earth fault may be determined based on a decrease in the zero sequence voltage of the network 112 or an indication thereof and/or on a decrease in the negative sequence current of the network 112 or an indication thereof.

However, the arc suppression coil may also be tuned away from resonance so that the fault current increases. This increase in fault current can be visible to the one or more relays 142, which may adapted to trip under conditions indicative of an excessive fault current. This allows using the tuning of the arc suppression coil to trip 220 the one or more relays 142, which in turn allows controllable tripping of the one or more relays 142. The tripping 220 can be performed in response to receiving the indication for the occurrence of the earth fault. It can be performed with or without delay after receiving the indication for the occurrence of the earth fault. For example, the arc suppression coil may be tuned away from resonance to trip 220 the one or more relays immediately or after a threshold time from the receipt of the indication for the presence of the earth fault. It is also possible to first try attempt to extinguish the fault arc, for example by tuning the arc suppression coil to resonance with respect to a resonance point such as a fault state resonance point of the network 112, e.g. by entering into a tracking mode. If, after one or more changes in tuning of the arc suppression coil, the attempt to extinguish the fault arc has not been successful, the arc suppression coil may be tuned away from resonance to trip 220 the one or more relays 142 in the network 112 to disconnect one or more power lines in the feeder 140 where the earth fault is present.

Tuning the arc suppression coil away from resonance to trip 220 the one or more relays allows the network 112 and its surroundings to be protected as the fault current can be removed, thereby extinguishing also the fault arc. The tripping 220 may be performed after a threshold time has passed from the occurrence of the earth fault 202, or the receipt of an indication thereof. The threshold time may be as small as, for example, 100-1000 milliseconds but it can also be larger, if appropriate. In particular, the threshold time may be dependent on the magnitude of the fault current so that for small enough levels of fault current it may be even infinite. While such a threshold time may be configured in the relays 142, a potential suppression of the fault current during the tracking mode means that the relays 142 may not necessarily have the correct information regarding the conditions of the earth fault, such as the actual time of occurrence of the earth fault. However, changing the tuning of the arc suppression coil allows flexibly triggering one or more relays 142 even when they are configured to function independently. The threshold time may also be determined based on one or more regulations pertaining to operation of the network 112, allowing flexible compliance with different regulatory regimes.

The algorithms of protective relays have typically troubles with low current levels so that tripping the relays by tuning the arc suppression coil allows improved control of the relay operation as well. Moreover, this control can be centralized, e.g. in the apparatus for operating the network 112. The control over the one or more relays 142 is indirect as it takes place by changing the current and/or voltage the one or more relays 142 are adapted to measure. Indirect control of the relays in the presence of an earth fault can be particularly effective when the arc suppression coil is tuned by adjusting the reluctance of the arc suppression coil, in particular by adjusting the magnitude of a virtual air gap of the arc suppression coil. These methods allow continuous control of the inductance of the arc suppression coil. They may also be operated without generating additional harmonics strengthening the fault arc.

Once one or more relays 142 have been tripped, fault location, isolation and removal (FLIR) operations may be performed 222 to remove the earth fault. Once the earth fault has been removed, the arc suppression coil may be returned 224 to off-resonance for normal operation 200 of the network 112.

Figure 3A:
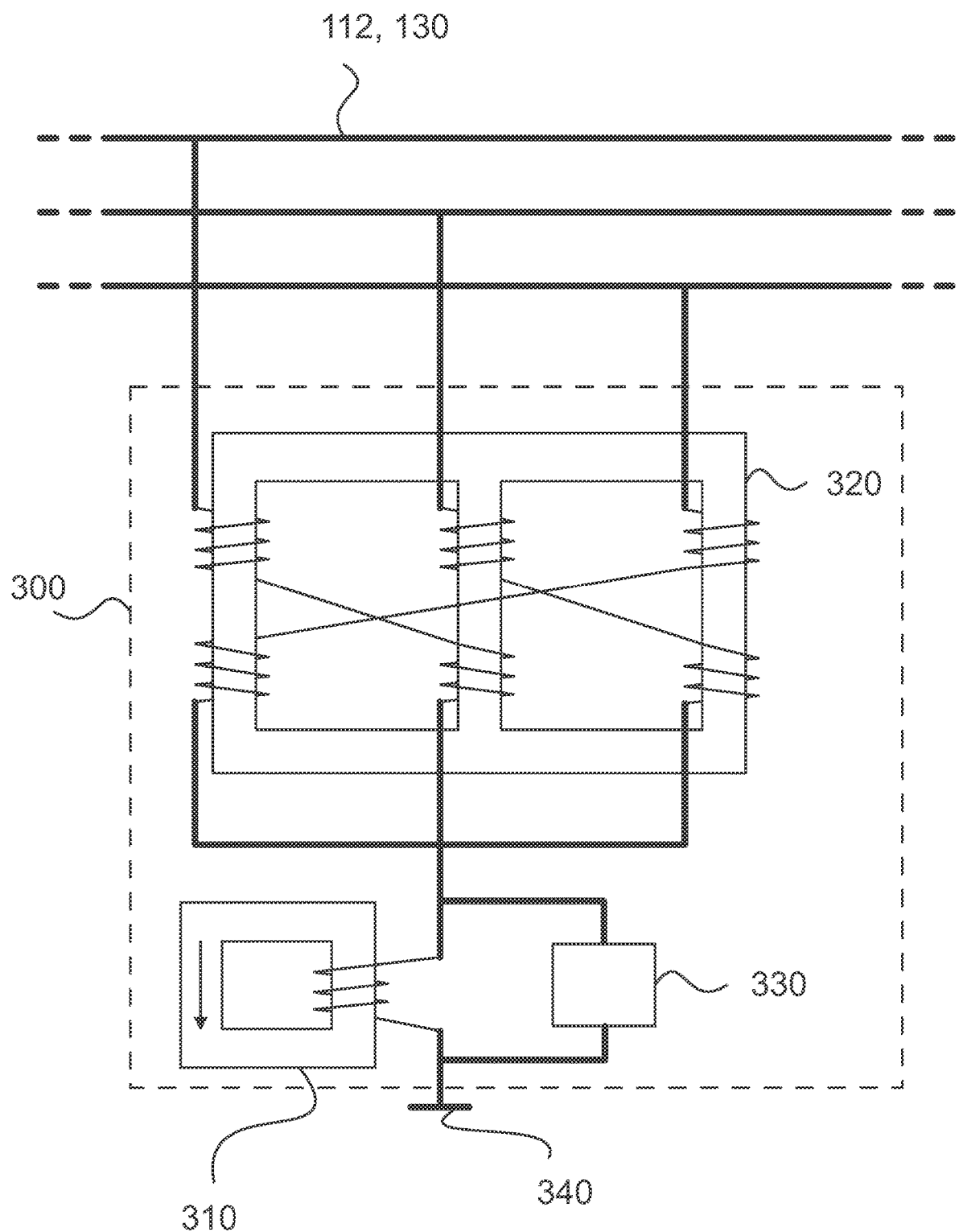
FIG. 3a illustrates a general arrangement for earth fault compensation.

FIG. 3a illustrates a general arrangement 300 for earth fault compensation. The arc suppression coil is operated in the network 112, which can be a three-phase network. The general arrangement 300 comprises an arc suppression coil 310 adapted to compensate earth faults in the network 112. In addition, the general arrangement 300 comprises an earthing transformer 320 through which the arc suppression coil 320 is connected to other parts of the network 112, e.g. through the bus 130. The general arrangement 300 is grounded to the earth 340 and the grounding connection may be made directly from the arc suppression coil 310, which is typically mechanically operated, for example so that a motor inside a transformer moves a metallic component, and cannot be adjusted during an earth fault. Consequently, a general arrangement 300 often comprises means 330 such as an oil-immersed high-power resistor together with a switch, which may be used during an earth fault to connect the resistor in parallel with the arc suppression coil 310. The arrangement 150 of the present disclosure may be formed in accordance with the general arrangement but with the arc suppression coil being adapted for its inductance to be adjustable during the presence of an earth fault.

Figure 3B:
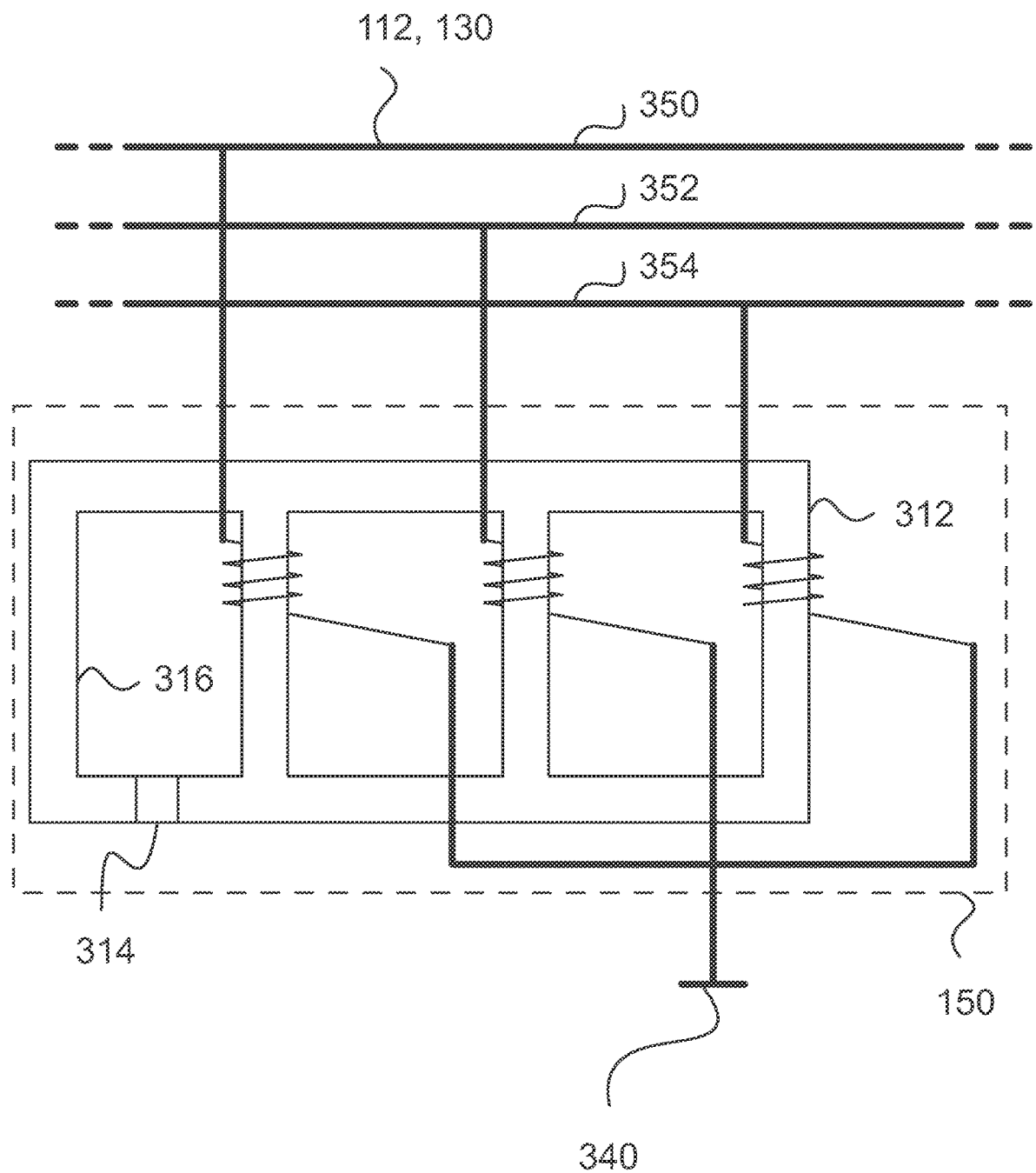
FIG. 3b illustrates an arrangement for earth fault compensation according to an example.

FIG. 3b illustrates an arrangement 150 for earth fault compensation according to an example. While the present disclosure may be used also with a regular arc suppression coil 310, such as the one disclosed above, together with means such as inverter, this particle example is illustrated as it allows particularly flexible operation of the arc suppression coil when an earth fault is present in the network 112.

In the example, the arc suppression coil 312 is operated in the network 112, which can be a three-phase network. The arrangement 150 comprises an arc suppression coil 312 adapted to compensate earth faults in the network 112. Importantly, the arc suppression coil 312 is adapted for its inductance to be adjusted while an earth fault is present in the network 112. It is therefore enough to use a single arc suppression coil 312 having an adjustable inductance but naturally the arrangement may also comprise one or more additional arc suppression coils. The arc suppression coil 312 may even be formed as one monolithic structure functioning both as an earthing transformer and an inductive compensator for the capacitive reactance of the network 112.

The inductance may be adjusted by adjusting the reluctance of the arc suppression coil 312, for example by adjusting the size of a virtual air gap 314 of the arc suppression coil. No separate earthing transformers and/or parallel resistors are needed, which may allow reduction in both cost and size of the arrangement 150. The inductance may be adjusted electrically, allowing notable increase in speed in comparison to mechanical adjustment means.

The arc suppression coil 320 may be directly connected to other parts of the network 112, for example directly to the bus 130. The arrangement 150 is grounded to the earth 340 and the grounding connection may be made directly from the arc suppression coil 312. In the absence of the earthing transformer, the arrangement 150 can be made without a star point, at least as a physical point. Correspondingly, the star point of the arrangement 150 may be a virtual star point. The zero sequence voltage for the network 112 or a value indicative thereof may be determined by calculation, e.g. as an average of measured phase voltages 350, 352, 354. The arrangement 150 can be made with substantially negligible DC (direct current) resistance.

The arrangement 150 may comprise means, such as an actuator, for forming a virtual air gap 314 in the arc suppression 312 for adjusting the reluctance of the arc suppression coil 312. The arc suppression coil 320 may be adapted to form a virtual air gap 314 in a transformer core of the arc suppression coil 312, for example at a limb and/or a yoke of the arc suppression coil 312. One example for forming a virtual air gap 314 is given as follows. A virtual air gap 314 may be formed electrically, for example by at least one winding wound at the arc suppression coil 312 in a transformer core of the arc suppression coil 312. The winding may be wound at a transformer core of the arc suppression coil 312, for example partially or fully around a limb 316 and/or a yoke of the arc suppression coil 312, e.g. through the limb 316 and/or the yoke. For the purpose of forming the virtual air gap 314, the arc suppression coil 312 may comprise a separate path adapted for carrying zero sequence magnetic flux, for example in form of a loop. While the arc suppression coil 312 may be formed The magnitude of the virtual air gap 314 may be adapted to be controlled by feeding current, for example DC current, into the winding. The winding(s) may be adapted to locally saturate the magnetic core of the path, when fed with the current, creating an effect similar to an air gap in the path and thereby increasing the reluctance of the path. The winding(s) may be arranged so that there is no induction to the winding circuit from the AC (alternating current) windings of the arc suppression coil 312 or the arrangement 150 connected to the phased power lines of the network 112. The virtual air gap 314 allows substantially linear operation of the arc suppression coil 312. It also allows very fast tuning, e.g. adjusting inductance of the arc suppression coil between a high and a low value in milliseconds. With electrical control of the reluctance of the arc suppression coil 312, no motors and/or moving parts are required, which may allow the size, cost and maintenance requirements of the arrangement 150 to be reduced.

The arc suppression coil 312 may be formed as a conventional arc suppression coil 310 with adjustable reluctance and used together with a separate earthing transformer. However, as stated above, the arc suppression coil 312 may also be formed as one monolithic structure functioning both as an earthing transformer and an inductive compensator for the capacitive reactance of the network 112. The arc suppression coil 312 may, for example, comprise a three-phase reactor for grounding the network 112 having three limbs and the separate path for zero sequence magnetic flux may be formed between the opposing ends of the three limbs of the three phase reactor, for example through a fourth limb. In an example, the arc suppression coil 312 comprises four or more limbs 316, where the arc suppression coil 312 is adapted for a path for zero sequence flux to be created through one of the limbs. The arc suppression coil 312 comprises means for forming a virtual air gap 314 for adjusting the reluctance of the path. The three other limbs comprise windings and connections for the three phases of a three-phase network 112. The path is formed as a return path for flux between the opposite ends of the three limbs. The design of the arc suppression coil 312 may correspond to that of a traditional reactor. The path with the virtual air gap 314 provides one example which allows capturing a part of the leakage flux of an arc suppression coil 312 for controlling the inductance of the arc suppression coil 312.

Figure 4:
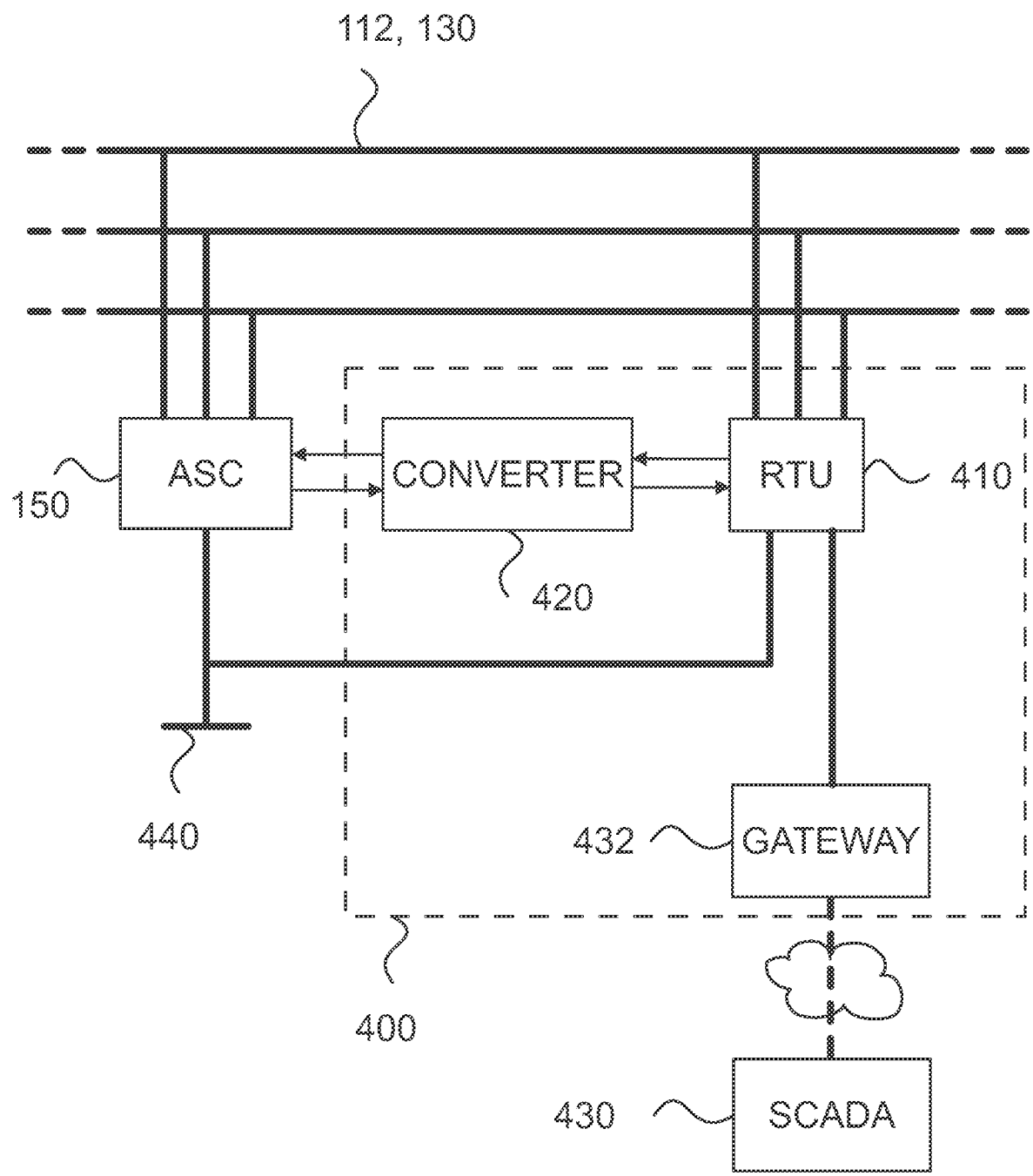
FIG. 4 is a schematic diagram of a system for operating an electric power network compensated by an arc suppression coil according to an example, FIGS. 5a,b illustrate operating an electric power network according to an example.

FIG. 4 is a schematic diagram of a system 400 for operating an electric power network compensated by an arc suppression coil according to an example. The system 400 is adapted to be electrically connected to the arrangement 150 for earth fault compensation. Moreover, the system 400 is adapted to be electrically connected to the network 112, for example to the bus 130. The network 112 may be, for example, delta-connected. The system 400 may be a local system, for example at an electrical substation or at a distribution transformer.

The system 400 comprises an apparatus 410, such as a controller, for operating the electric power network, in particular by operating an arc suppression coil of the arrangement 150. The apparatus 410 may be adapted to function as a stand-alone unit but for many typical applications, the apparatus 410 can be adapted to function as a part of a distributed system 430 for controlling the network 112, e.g. it may be a remote terminal unit (RTU), such as an RTU of a SCADA system. The apparatus 410 may be adapted to be connected to the network 112, e.g. to the bus 130, for determining information indicative of the status of the network 112, e.g. a resonance point of the network such as a normal state and/or fault state resonance point of the network 112.

The apparatus 410 may comprise at least one processor and at least one memory comprising computer program code. The at least one memory and the computer program code can be configured to, with the at least one processor, receive an indication for an occurrence of an earth fault in the network 112 and tune the arc suppression coil of the arrangement 150 away from resonance with respect to a resonance point of the network 112, while the earth fault is present in the network 112, to increase fault current in the network 112 for tripping one or more protective relays in the network 112. The at least one memory and the computer program code can be further configured to, with the at least one processor, perform any or all of the functions disclosed herein for operating the arc suppression coil and/or determining information indicative of the state of the network 112 such as the zero sequence voltage of the network 112 and/or the negative sequence current of the network 112.

The apparatus 410 is electrically connected to the arc suppression coil for operating the arc suppression coil, in particular for adjusting the inductance of the arc suppression coil. Specifically, while the apparatus 410 is adapted to adjust the inductance of the arc suppression coil during normal operation of the network 112, the apparatus 410 may be adapted to adjust the inductance of the arc suppression coil also while the earth fault is present in the network 112. This means that the arc suppression coil can be tuned with respect to the resonance point of the network 112 both in the absence and presence of an earth fault. For tuning the arc suppression coil, the apparatus 410 may be adapted to control one or more analog outputs ($V_{COMP}$) for controlling the inductance of the arc suppression coil, for example by feeding current, such as DC current, to the one or more windings adapted for forming a virtual air gap 314 for adjusting the reluctance of the arc suppression coil. Voltage- and/or current-based control may be used. The system 400 may comprise a converter 420, e.g. a DC-DC converter or an AC-DC converter, between the arc suppression coil and the apparatus 410. The converter 420 may have, for example, an analog input of 0-10 V from the apparatus 410 and/or a current output of 0-30 A to the arrangement 150. The apparatus 410 may be grounded to an earth 440, which may be the earth 340 of the arrangement 150 for earth fault compensation, for example by a direct connection.

The apparatus 410 may be arranged to function independently for tripping the one or more relays 142 in the network 112. For this purpose, it may use one or more measurements indicative of zero sequence voltage of the network 112 and/or one or more measurements indicative of negative sequence current voltage of the network 112. Alternatively or additionally, other types of measurements may be used. The one or more measurements may be local measurements. The one or more measurements may be performed at the bus 130, e.g. at a substation bus. The apparatus 410 may be adapted to function without separate configuration with respect to the network 112. For example, it does not need to know the magnitude of the capacitance of the network 112. It is enough to use the measurements indicative of the zero sequence voltage and/or the negative sequence current of the network to operate the arc suppression coil. The zero sequence voltage may be maximized, for example, by dithering.

The system 400 may comprise a gateway 432 for remote communication with one or more external systems, e.g. with a distributed system 430 such as a SCADA system. The apparatus 410 may be adapted to be connected to the one or more external systems 430 through the gateway 432. For example, the gateway 432 may conform to the standard IEC 61850 and/or IEC 60870, such as IEC 60870-5-104.

Figure 5A:
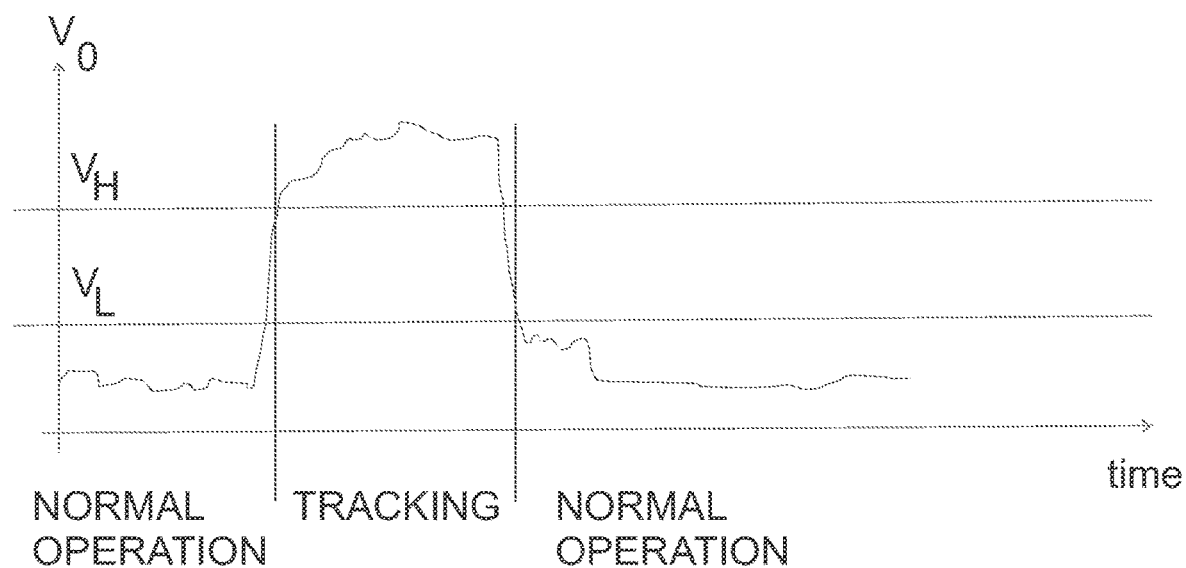

FIGS. 5a,b illustrate operating an electric power network 112 according to an example. In the figures and in the text below, an example development of the zero sequence voltage $V_0$ of the network 112 is illustrated as a function of time. It should be understood that additionally or alternatively to any determination indicative of a voltage, such as the zero sequence voltage of the network, another determination, such as a determination indicative of the fault current in the network e.g. a determination indicative of the negative sequence current of the network, may be used. A threshold for voltage may thereby be replaced by a threshold for current.

During normal operation of the network 112 the zero sequence voltage remains below a first threshold voltage $V_H$. The occurrence of an earth fault can be determined based on an increase of the zero sequence voltage above the first threshold voltage $V_H$. In response, the arc suppression coil may be tuned in one or more attempts to try to remove the earth fault. This corresponds to initiating a tracking mode for attempting to remove the earth fault.

If the attempt is successful, a case illustrated in FIG. 5a, the zero sequence voltage decreases. The disappearance of the earth fault can be determined based on a decrease of the zero sequence voltage below a second threshold voltage $V_L$. Once it has been determined that the earth fault has disappeared, the arc suppression coil can be returned to off-resonance for normal operation of the network 112.

Figure 5B:
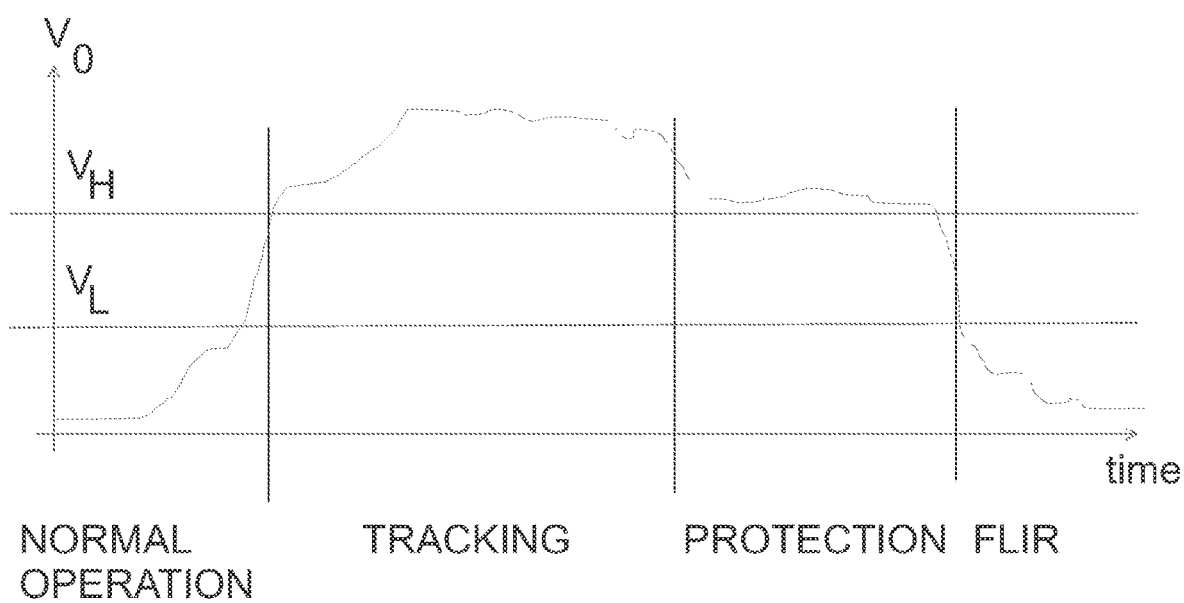

If the attempt is not successful or if no attempts are made, a case illustrated in FIG. 5b, the zero sequence voltage remains at an elevated level. In this case, the arc suppression coil may be tuned away from resonance to trip one or more relays for protecting the network 112 and its surroundings. This corresponds to initiating a protection mode for removing current from the faulty feeder. The finite time required for a relay to react has been illustrated in the figure but it should be noted that this is not necessarily in scale and the actual reaction time may be small. Once the current has been removed, the zero sequence voltage decreases. The removal of the fault current can be determined, for example, based on a decrease of the zero sequence voltage below the second threshold voltage $V_L$. Once it has been determined that the fault current has disappeared, fault location, isolation and removal operations may be performed for the network 112.

The tripping may be performed by tuning the arc suppression coil, for example by tuning the one or more analog outputs of the apparatus 410. This may be performed by tuning the arc suppression coil away from resonance until the zero sequence voltage falls below a tuning threshold, which may be a configurable parameter. The tuning threshold may be, for example, determined as a proportion of a maximum zero sequence voltage recorded, whether it is under normal operation or in the presence of the earth fault. Tuning for keeping the zero sequence voltage below the tuning threshold may be maintained until the zero sequence voltage drops below the second threshold voltage $V_L$. The tuning may be maintained as a constant tuning or as a changing tuning moving increasingly away from resonance, e.g. by continuous or sequential increases.

It is noted that a first threshold value, such as the first threshold voltage $V_H$ or a first threshold current, may be used for determining the occurrence of an earth fault. Also, a second threshold value, such as a second threshold voltage $V_L$ or a second threshold current, may be used for determining the disappearance of an earth fault. The first threshold value and/or the second threshold value may be compared, for example by the apparatus 410, to the zero sequence voltage of the network or a value indicative thereof and/or to the negative sequence current of the network or a value indicative thereof. The apparatus 410 may be adapted to bring about measurement of the zero sequence voltage or a value indicative thereof and/or of the negative sequence current of the network or a value indicative thereof, for example from the bus 130. The first threshold value and the second threshold value may be the same but they can also be different, for example so that the first threshold value corresponds to a larger value than the second threshold value. This can be used to reduce the occurrence of false positives and/or negatives for determination of the presence of the earth fault.

Figure 6A:
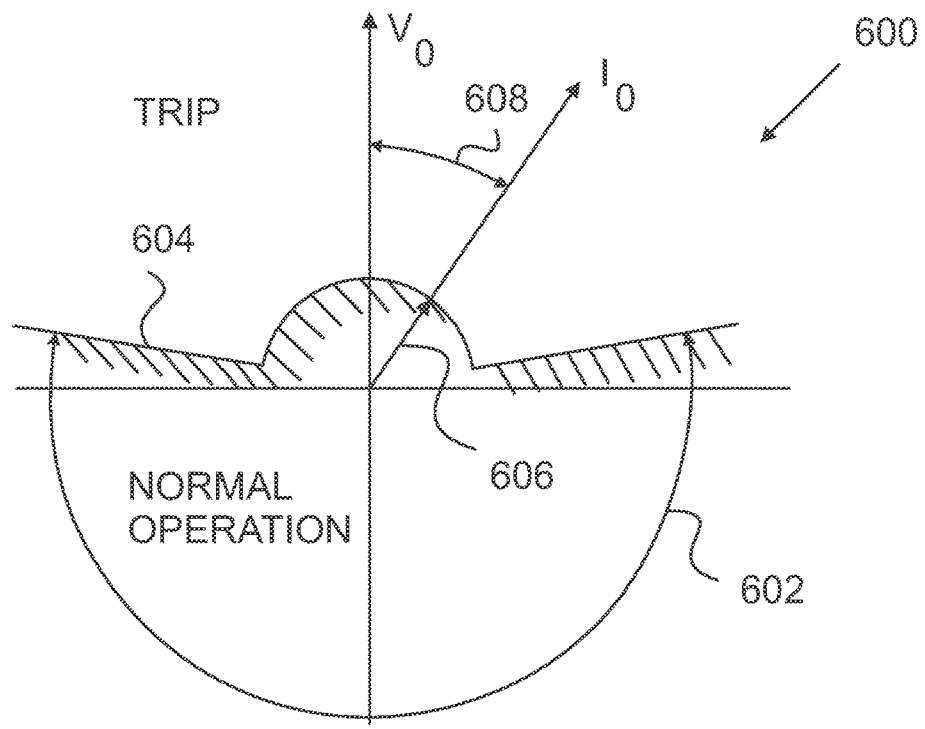
FIG. 6a illustrates relay characteristics of a compensated network.
Figure 6B:
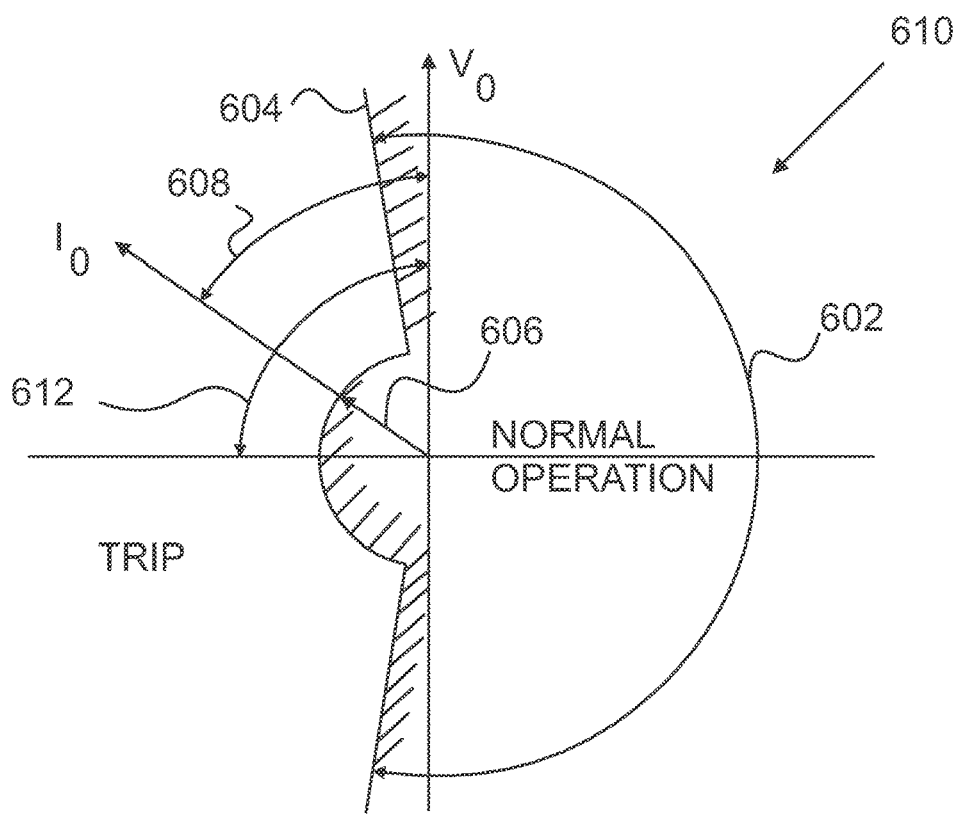
FIG. 6b illustrates relay characteristics of an isolated network.

FIGS. 6a and 6b illustrate examples of relay characteristics. These particular examples illustrate angular relay characteristics, where a relay can be configured to operate, e.g. trip, based on a phase difference. Various different relay characteristics, as such, are known to a person skilled in the art for configuring protective relays such as the one or more relays 142. The example characteristics are illustrated in a complex plane so that the relation between the zero sequence voltage $V_0$ and the sum current $I_0$ can be observed. The sum current can be determined as a sum of the phase currents in the network 112, e.g. in a feeder. In particular, the phase difference 608 between the zero sequence voltage and the sum current can be used as basis for tripping the relay, for example as illustrated in the figures. However, various other relay characteristics exist as well, for example where tripping is based on effective or parasitic values of the sum current.

In the examples, the relay is in normal operation, i.e. not-tripped, when the phase difference 608 corresponds to a normal operation region 602 in the relay characteristics. In addition, there is typically a threshold 606 for the magnitude of the sum current, below which the relay remains in normal operation. On the other hand, if the phase difference 608 and/or the magnitude of the sum current correspond to an activation region in the relay characteristics, the relay is configured to trip. The activation region may be defined by one or boundaries 604. It may be a complement of the normal operation region 602.

Typically, relays in compensated networks are configured with the relay characteristics of a compensated network, such as the compensated network angular relay characteristics 600 illustrated in FIG. 6a. In this example, the base angle is zero and the range of variation is, for example, within −88 and +88 degrees.

However, it has been noted that the present disclosure may be efficiently utilized when the one or more relays 142 are configured with relay characteristics of an isolated network, for example as the isolated network angular relay characteristics 610 illustrated in FIG. 6b. For angular relay characteristics, the base angle 612 may then be 90 degrees. The range of variation may remain substantially within −88 and +88 degrees. The boundaries 604 of the activation region may thereby be defined substantially at 2 degrees and at 178 degrees, for example at 2 plus/minus 0-1 degrees and at 178 plus/minus 0-1 degrees.

The apparatus may be implemented in software, hardware, application logic or a combination of software, hardware and application logic. The application logic, software or instruction set may be maintained on any one of various conventional computer-readable media. A "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The databases may be located on one or more devices comprising local and/or remote devices such as servers. The processes described with respect to the exemplary embodiments can include appropriate data structures for storing data collected and/or generated by the processes of the devices and subsystems of the exemplary embodiments in one or more databases.

All or a portion of the exemplary embodiments can be implemented using one or more general purpose processors, microprocessors, digital signal processors, micro-controllers, and the like, programmed according to the teachings of the exemplary embodiments, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

The different functions discussed herein may be performed in a different order and/or concurrently with each other.

Any range or device value given herein may be extended or altered without losing the effect sought, unless indicated otherwise. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus for operating an electric power network, wherein the electric power network is a compensated network arranged to be compensated by an arc suppression coil, the apparatus being adapted to receive an indication for an occurrence of an earth fault in the electric power network,
wherein the apparatus being adapted to tune the arc suppression coil away from resonance with respect to a resonance point of the electric power network, while the earth fault is present in the electric power network, to increase a fault current in the electric power network for tripping one or more protective relays in the electric power network.

2. The apparatus according to claim 1, adapted to tune the arc suppression coil by adjusting a reluctance of the arc suppression coil.

3. The apparatus according to claim 2, adapted to adjust the reluctance of the arc suppression coil by adjusting a size of a virtual air gap of the arc suppression coil.

4. The apparatus according to claim 1, adapted to determine a threshold time for tripping the one or more protective relays and tune the arc suppression coil away from resonance after the threshold time from receiving the indication for the occurrence of the earth fault in the electric power network.

5. The apparatus according to claim 1, wherein the one or more protective relays are configured with relay characteristics of an isolated network.

6. The apparatus according to claim 1, adapted to determine the resonance point of the electric power network or an indication thereof by maximizing a zero sequence voltage and/or minimizing a negative sequence current of the electric power network.

7. The apparatus according to claim 1, wherein the indication for the occurrence of the earth fault is determined based on an increase in a zero sequence voltage of the electric power network or an indication thereof and/or on an increase in a negative sequence current of the electric power network or an indication thereof.

8. A method for operating an electric power network, wherein the electric power network is a compensated network arranged to be compensated by an arc suppression coil, the method comprising:
   receiving an indication for an occurrence of an earth fault in the electric power network, and
   tuning the arc suppression coil away from resonance with respect to a resonance point of the electric power network, while the earth fault is present in the electric power network, to increase a fault current in the electric power network for tripping one or more protective relays in the electric power network.

9. The method according to claim 8, wherein the arc suppression coil is tuned by adjusting a reluctance of the arc suppression coil.

10. The method according to claim 9, wherein the reluctance of the arc suppression coil is adjusted by adjusting a size of a virtual air gap of the arc suppression coil.

11. The method according to claim 8 comprising determining a threshold time for tripping the one or more protective relays and tuning the arc suppression coil away from resonance after the threshold time from receiving the indication for the occurrence of the earth fault in the electric power network.

12. The method according to claim 8, wherein the one or more protective relays are configured with relay characteristics of an isolated network.

13. The method according to claim 8 comprising determining the resonance point of the electric power network or an indication thereof by maximizing a zero sequence voltage and/or minimizing a negative sequence current of the electric power network.

14. The method according to claim 8, wherein the indication for the occurrence of the earth fault is determined based on an increase in a zero sequence voltage of the electric power network or an indication thereof and/or on an increase in a negative sequence current of the electric power network or an indication thereof.

15. A computer program product comprising instructions which, when executed by a computer, cause the computer to carry out the method of claim 8.

* * * * *